US010108221B1

(12) United States Patent
Gu et al.

(10) Patent No.: US 10,108,221 B1
(45) Date of Patent: Oct. 23, 2018

(54) ALL-IN-ONE COMPUTER

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Chun-Bao Gu, Wuhan (CN); Chen-Xi Yang, Wuhan (CN); Wen-Hsiang Hung, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/640,590

(22) Filed: Jul. 3, 2017

(30) Foreign Application Priority Data

Apr. 21, 2017 (CN) .......................... 2017 1 0267150

(51) Int. Cl.
*G06F 1/16* (2006.01)
*G06F 1/18* (2006.01)

(52) U.S. Cl.
CPC ............ *G06F 1/1601* (2013.01); *G06F 1/181* (2013.01); *G06F 1/184* (2013.01); *G06F 1/189* (2013.01); *G06F 2200/1612* (2013.01); *G06F 2200/1631* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,144,452 B2* | 3/2012 | Huang | ................... | G06F 1/187 361/679.02 |
| 8,248,780 B2* | 8/2012 | Zheng | ...................... | G06F 1/16 165/80.3 |
| 8,537,532 B2* | 9/2013 | Chen | ...................... | G06F 1/181 248/917 |
| 2003/0063059 A1* | 4/2003 | Farrow | ...................... | G06F 1/16 345/92 |
| 2013/0010418 A1* | 1/2013 | Flynn | ........................ | G06F 1/16 361/679.21 |
| 2013/0135814 A1* | 5/2013 | Lee | ........................ | G06F 1/184 361/679.33 |
| 2015/0002994 A1* | 1/2015 | Kamepalli | ............. | G06F 1/189 361/679.3 |
| 2016/0161045 A1* | 6/2016 | Lee | ........................ | F16M 11/10 361/679.22 |
| 2016/0282908 A1* | 9/2016 | Holden | ................. | G06F 1/1637 |
| 2017/0329364 A1* | 11/2017 | Kim | ...................... | G06F 1/1601 |

* cited by examiner

*Primary Examiner* — Lisa Lea Edmonds
(74) *Attorney, Agent, or Firm* — ScienBiziP, P.C.

(57) ABSTRACT

A reduced-volume all-in-one computer includes a shell, a display unit received in the shell, a supporting brace, a host adapter, and a transfer board. The display unit includes a display port. The supporting brace includes a base and a supporting member and the host adapter is received in the supporting member and integrates numerous electronic elements of a computer system. The electronic elements include a central processing unit, a memory chip, an image processor, and a memory. The transfer board in the supporting member includes a power port and a video port connecting to the display port. The transfer board is connected to the host adapter and forms a communication bridge between the host adapter and the display unit.

20 Claims, 8 Drawing Sheets

ALL-IN-ONE COMPUTER

CROSS-REFERENCE TO RELATED APPLICATIONS

This application claims priority to Chinese Patent Application No. 201710267150.2, filed on Apr. 21, 2017, the contents of which are incorporated by reference herein.

FIELD

The subject matter herein generally relates to all-in-one computers.

BACKGROUND

All-in-one computers include hosts, displayers, shells, and supporting braces. The shell defines a receiving space. The host and the displayer are received in the receiving space thus a size of the shell is large.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein. The disclosure is illustrated by way of example and not by way of limitation in the figures of the accompanying drawings, in which like references indicate similar elements. It should be noted that references to "an" or "one" exemplary embodiment in this disclosure are not necessarily to the same exemplary embodiment, and such references mean at least one.

The term "comprising" means "including, but not necessarily limited to"; it specifically indicates open-ended inclusion or membership in a so-described combination, group, series, and the like.

Figure 1:
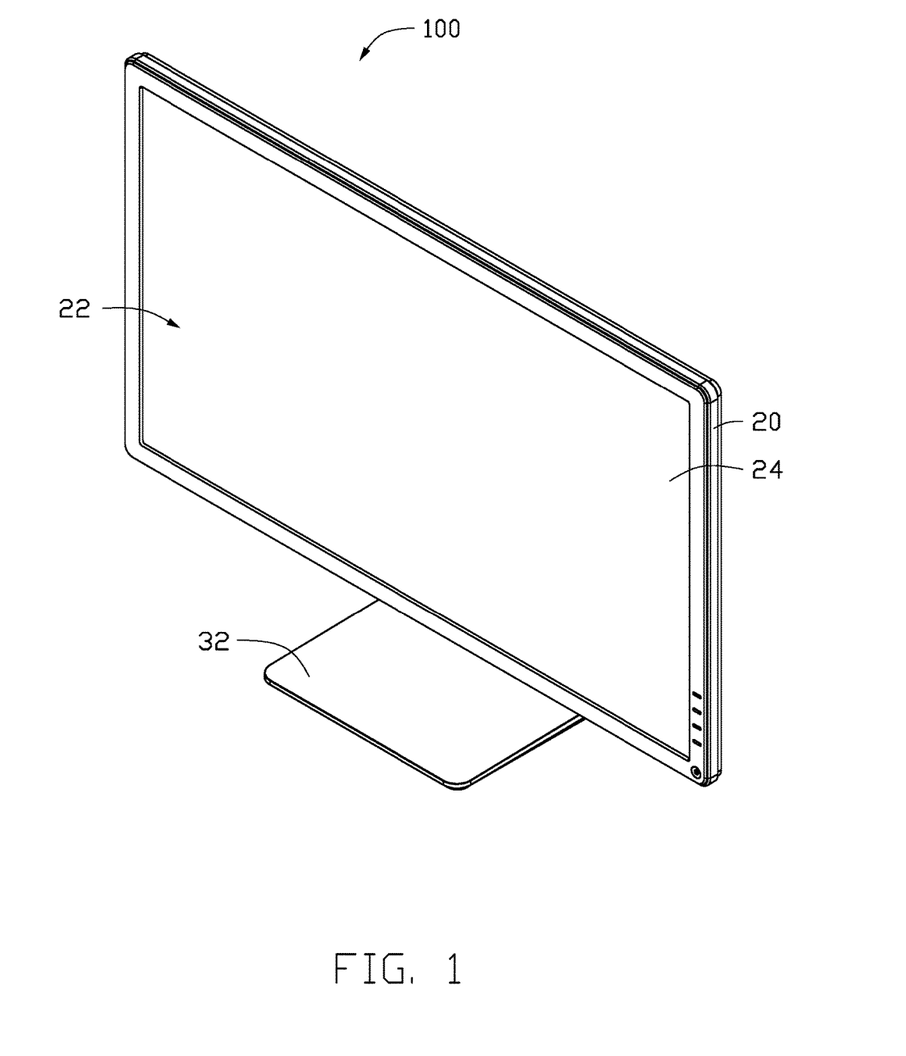
FIG. 1 is an isometric view of an exemplary embodiment of an all-in-one computer.
Figure 2:
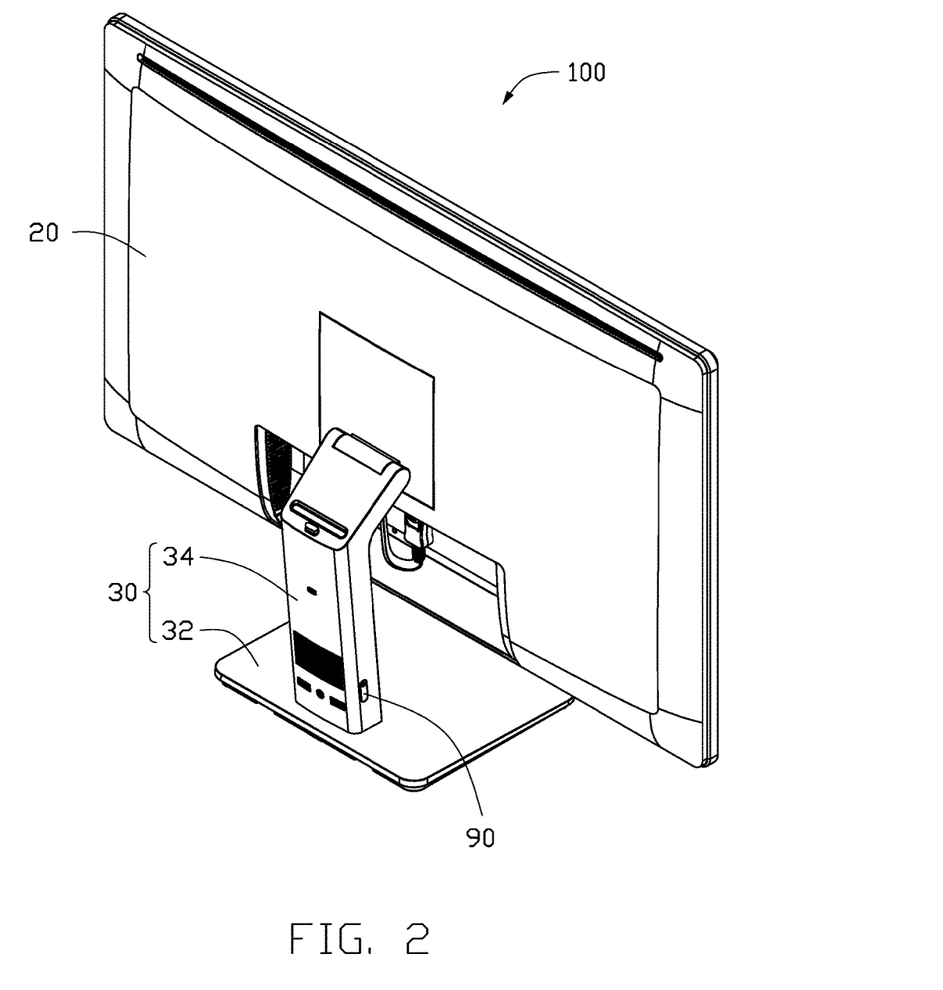
FIG. 2 is similar to FIG. 1, but viewed from another viewpoint.
Figure 3:
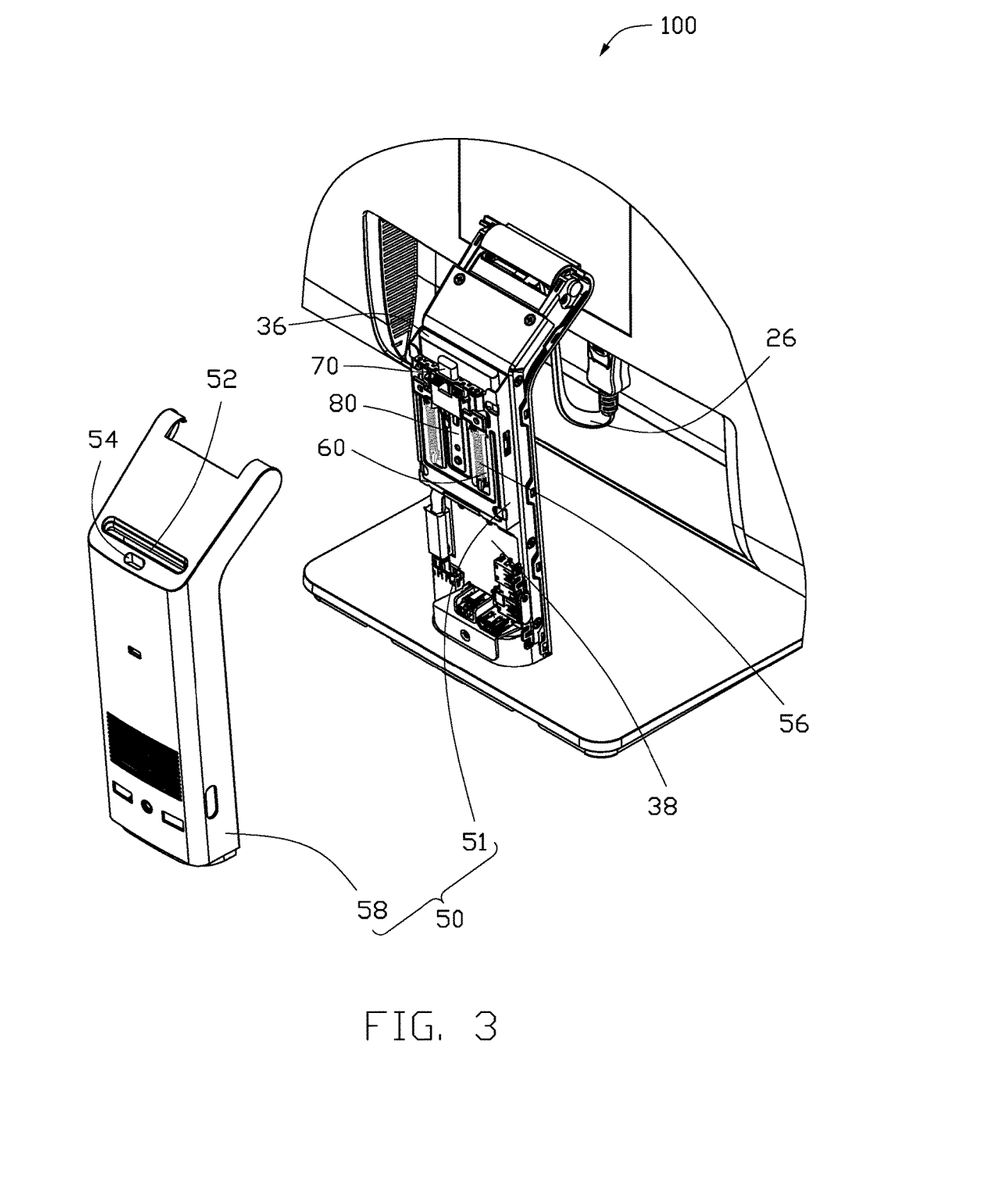
FIG. 3 is similar to FIG. 1, but with a part of fixing shell omitted.
Figure 4:
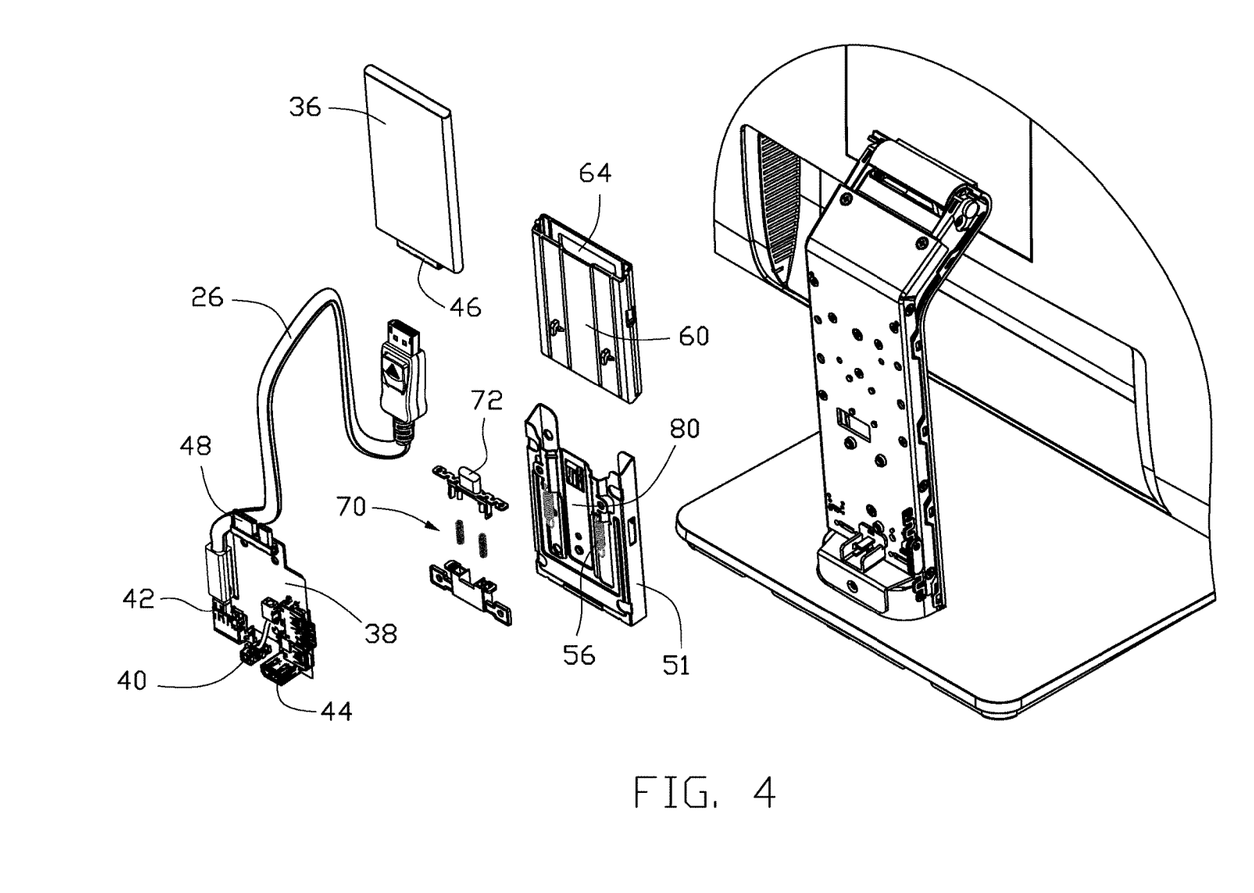
FIG. 4 is an exploded view of an exemplary embodiment of an all-in-one computer.
Figure 5:
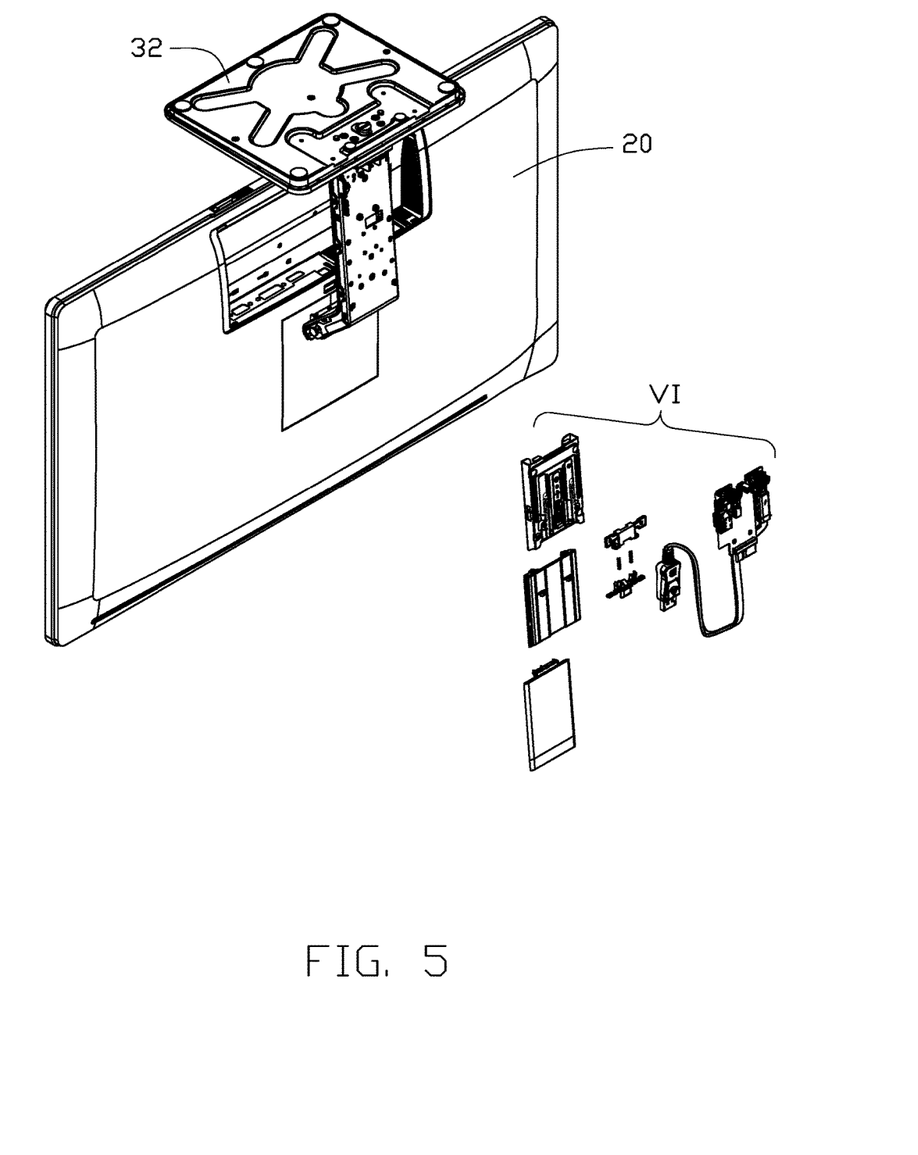
FIG. 5 is similar to FIG. 3, but viewed from another viewpoint.
Figure 6:
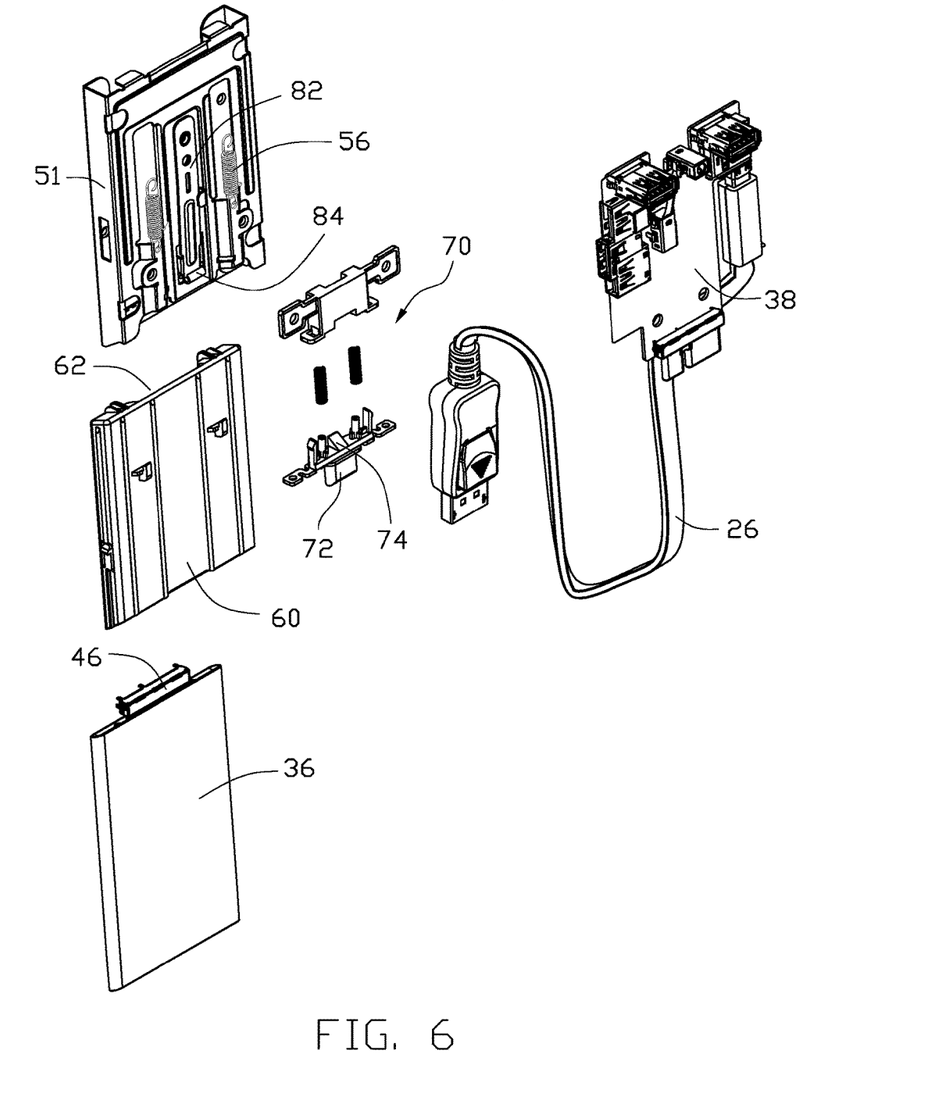
FIG. 6 is an enlarged view of components indicated by marker VI in FIG. 5.

FIGS. 1 to 2 illustrate an all-in-one computer 100 including a shell 20, a display unit 22 received in the shell 20, and a supporting brace 30. The display unit 22 includes a display screen 24. The supporting brace 30 includes a base 32 and a supporting member 34 attached between the base 32 and the shell 20. The supporting member 34 is rotatably connected to the display screen 24 to adjust an angle of the display unit 22.

FIGS. 3 to 6 illustrate the all-in-one computer 100 further including a host adapter 36 and a transfer board 38. The host adapter 36 integrates electronic elements of a computer system. The electronic element includes a central processing unit, a memory chip, an image processor and a memory. The transfer board 38 includes a power port 40, a video port 42 and a number of peripheral device ports 44. The peripheral device port 44 includes a mouse port and a keyboard port. The power port 40 is configured to connect to a power supply. The display unit 22 further includes a display port (not labeled). The display port connects to the video port through data cable. The transfer board 38 connects to the host adapter 36 to connect the host adapter 36 with the display unit and peripheral devices. The host adapter 36 includes a data port 46. The transfer board 38 includes a host port 48. The host port 48 connects the data port 46 to transmit data between the host adapter 36 and the host port 48. FIG. 2 illustrates that a power switch 90 protrudes from the base 30. The power switch 90 connects to the transfer board 38 to turn on/off the all-in-one computer 100.

The host adapter 36 is detachably attached to the transfer board 38. The supporting member 34 includes a fixing case 50 and a receiving member 60 received in the fixing case 50. The receiving member 60 is movable in a first direction. The receiving member 60 defines a through hole 62 and a receiving groove 64 communicating to the through hole 62. The through hole 62 is opposite to the host port 48. The fixing case 50 defines an inserting hole 52 and a pressing hole 54 in the first direction. A pressing member 70 is received in the pressing hole 54. A locking member 80 is attached to the fixing case 50 and is movable in a second direction. The host adapter 36 passes the inserting hole 52 along the first direction to be received in the receiving groove 64. When the host adapter 36 moves along the first direction, the receiving member 60 moves toward the transfer board 38 along the first direction and locks to the locking member 80 at the host adapter 36 connecting the transfer board 38. The pressing member 70 is pressed along the first direction to drive the locking member 80 to move along the second direction to separate the receiving member 60 from the locking member 80 and move away from the transfer board 38, to separate the host adapter 36 from the transfer board 38. The first direction is perpendicular to the second direction.

The supporting member 34 further includes two elastic pieces 56. A first end of the elastic piece 56 is attached to the fixing case 50, a second end of the elastic piece 56 is attached to the receiving member 60. When the host adapter 36 is received in the receiving groove 64 and moves along the first direction, the host adapter 36 overcomes elastic force of the first elastic member 56 to drive the receiving member 60 to move toward the transfer board 38 along the first direction. When the locking member 80 separates from the receiving member 60, the first elastic member 56 restores to make the receiving member 60 to move away from the transfer board 38 along the first direction, to drive the host adapter 36 to separate from the transfer board 38.

Figure 7:
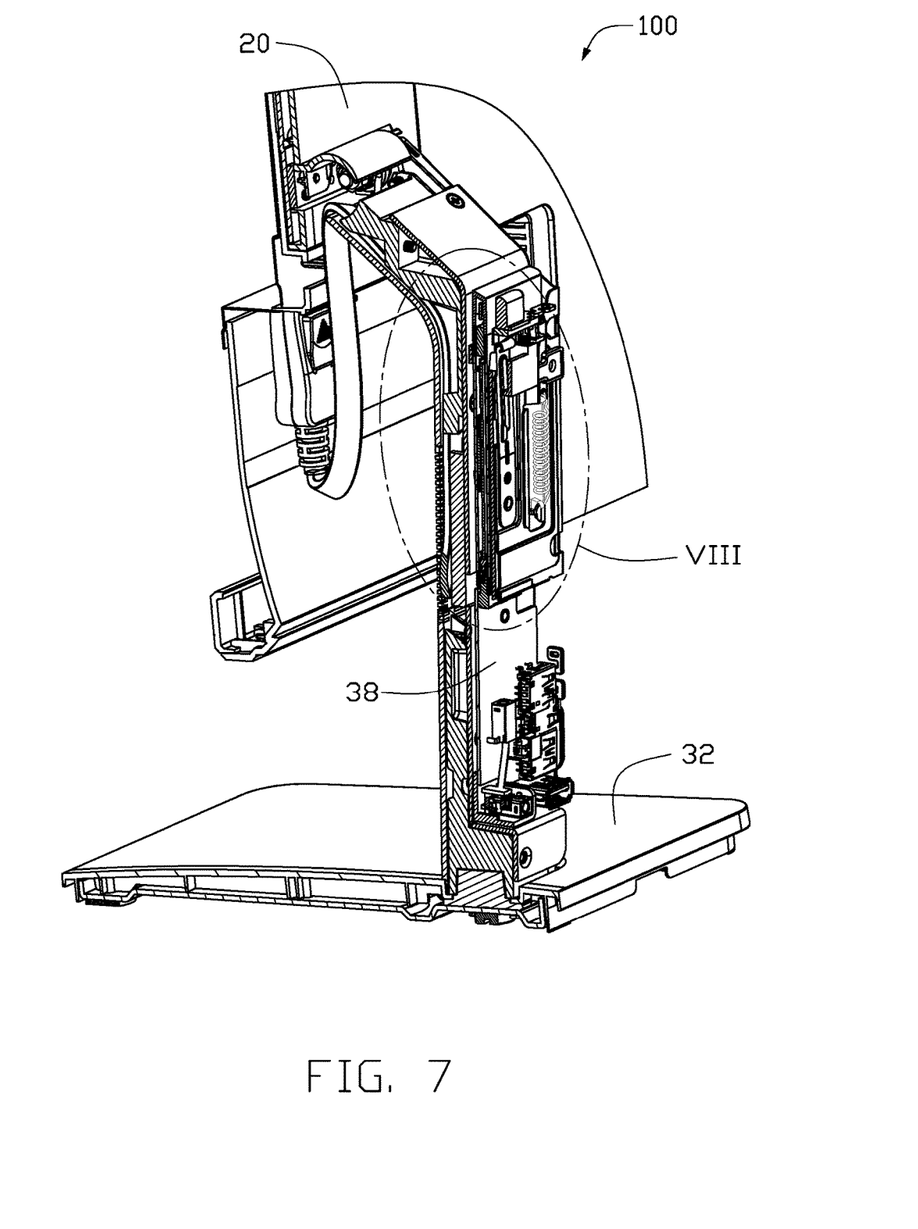
FIG. 7 is a cross-section view of the all-in-one computer of FIG. 3.
Figure 8:
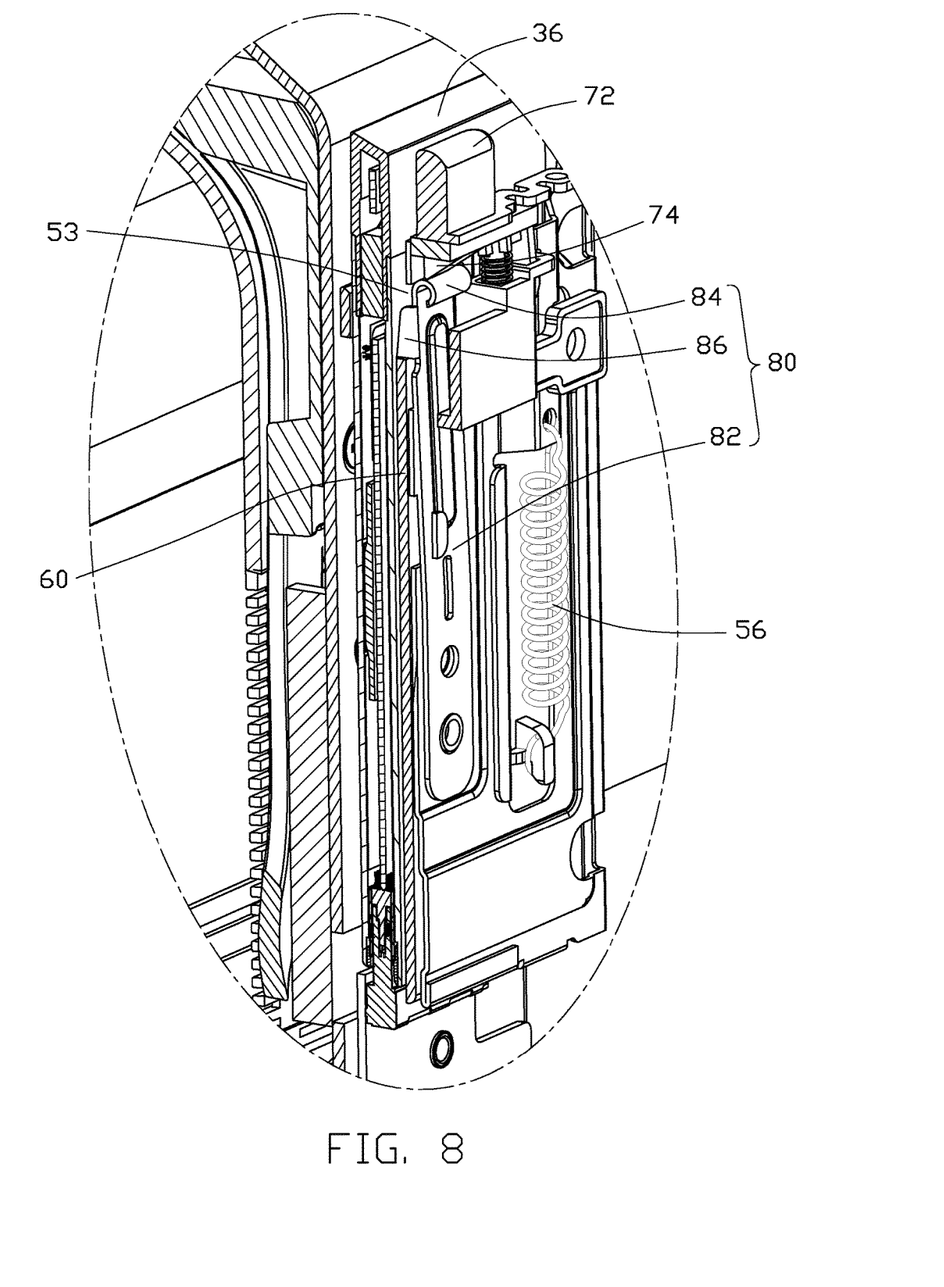
FIG. 8 is an enlarged view of enclosed area VIII in FIG. 7.

The pressing member 70 includes a pressing portion 72 and a guiding portion attached to the pressing portion 72. The guiding portion 74 is in form of a wedge with an inclined surface. FIGS. 7 and 8 illustrate the locking member 80 including a plate 82, a moving portion 84, and a locking portion 86. The moving portion 84 is fixed to an end of the plate 82 and touches the inclined surface. A surface of the moving portion touching the inclined surface is a cambered surface. The locking portion 86 perpendicularly protrudes from a side of the plate 82 and is configured to lock to the receiving member 60. When the pressing portion 72 is pressed, the inclined surface abuts and drives the moving portion 84 to move in the second direction to separate the locking portion 86 from the receiving member 60. The locking member 80 is elastic. When the pressing portion is released, the locking member 80 is reset.

The fixing case 50 includes an enclosure 58 and a fixing frame 51 fixed to an inner side of the enclosure 58. The receiving member 60 is sleeved in the fixing frame 51. The first end of the elastic piece 56 is fixed to the fixing frame 51. The locking member 80 is positioned between the fixing frame 51 and the enclosure 58 and is fixed to the fixing frame 51. The locking member 80 is fixed to the fixing frame 51 through rivets. The fixing frame 51 defines a locking hole 53. When the host adapter 36 is not positioned in the receiving member 60, the locking portion 86 is received in the locking hole 53 and abuts the receiving member 60. When the receiving member 60 moves to be positioned under the locking hole 53 along the first direction, the locking portion 86 passes through the locking hole 53 to abut an upper end of the receiving member 60.

The exemplary embodiments shown and described above are only examples. Even though numerous descriptions and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. An all-in-one computer comprising:
   a shell;
   a display unit received in the shell, the display unit comprising a display screen and a display port;
   a supporting brace comprising a base and a supporting member attached between the base and the shell;
   a host adapter received in the supporting member and integrating electronic elements of a computer system, the electronic element comprising a central processing unit, a memory chip, an image processor and a memory; and
   a transfer board received in the supporting member and comprising a power port and a video port electronically connected to the display port, the transfer board electronically connected to the host adapter to enable the host adapter to communicate with the display unit.

2. The all-in-one computer as claimed in claim 1, wherein the transfer board further comprises at least one peripheral device port, the transfer board further communicate the host adapter to the peripheral device.

3. The all-in-one computer as claimed in claim 1, wherein host adapter is detachably attached to the transfer board.

4. The all-in-one computer as claimed in claim 3, wherein the supporting member comprises a fixing case and a receiving member received in the fixing case, the receiving member is movable in a first direction, the receiving member defines a through hole and a receiving groove communicating to the through hole, the through hole is opposite to the host port, the fixing case defines an inserting hole and a pressing hole in the first direction, a pressing member is received in the pressing hole, a locking member is attached to the fixing case and is movable in a second direction, the host adapter passes the inserting hole along the first direction to be received in the receiving groove, when the host adapter moves along the first direction, the receiving member moves toward the transfer board along the first direction and locks to the locking member at the host adapter connecting the transfer board, the pressing member is pressed along the first direction to drive the locking member to move along the second direction to make the receiving member to separate from the locking member and move away from the transfer board to drive the host adapter to separate from the transfer board.

5. The all-in-one computer as claimed in claim 4, wherein the first direction is perpendicular to the second direction.

6. The all-in-one computer as claimed in claim 4, wherein the supporting member further comprises at least one elastic piece, a first end of the elastic piece is attached to the fixing case, a second end of the elastic piece is attached to the receiving member, when the host adapter is received in the receiving groove and moves along the first direction, the host adapter overcomes elastic force of the first elastic member to drive the receiving member to move toward the transfer board along the first direction, when the locking member separates from the receiving member, the first elastic member rebounds to make the receiving member to move away from the transfer board along the first direction to drive the host adapter to separate from the transfer board.

7. The all-in-one computer as claimed in claim 4, wherein the pressing member comprises a pressing portion and a guiding portion attached to the pressing portion, the guiding portion has a wedge surface, the locking member comprises a moving portion and a locking portion, the locking portion is configured to lock to the receiving member, when the pressing portion is pressed, the wedge surface abuts and drives the moving portion to move in the second direction to separate the locking portion from the receiving member.

8. The all-in-one computer as claimed in claim 7, wherein the locking member comprises a plate, the moving portion is fixed to an end of the plate, the locking portion perpendicularly protrudes from a side of the plate.

9. The all-in-one computer as claimed in claim 7, wherein the locking member is elastic, when the pressing portion is released, the locking member resets.

10. The all-in-one computer as claimed in claim 7, wherein the fixing case comprises an enclosure and a fixing frame fixed to an inner side of the enclosure, the locking member is positioned between the fixing frame and the enclosure and is fixed to the fixing frame, the fixing frame defines a locking hole, when the receiving member moves to be positioned under the locking hole along the first direction, the locking portion passes through the locking hole to abut an up end of the receiving member.

11. An all-in-one computer comprising:
    a shell;
    a display unit received in the shell, the display unit comprising a display screen and a display port;

a supporting brace comprising a base and a supporting member rotatably connected the shell;

a host adapter received in the supporting member and comprising a central processing unit, a memory chip, an image processor and a memory; and a transfer board received in the supporting member and comprising a power port and a video port electronically connected to the display port, the transfer board electronically connected to the host adapter to transfer data from the host adapter to the display unit.

12. The all-in-one computer as claimed in claim 11, wherein the transfer board further comprises at least one peripheral device port, the transfer board further communicate the host adapter to the peripheral device.

13. The all-in-one computer as claimed in claim 11, wherein host adapter is detachably attached to the transfer board.

14. The all-in-one computer as claimed in claim 13, wherein the supporting member comprises a fixing case and a receiving member received in the fixing case, the receiving member is movable in a first direction, the receiving member defines a through hole and a receiving groove communicating to the through hole, the through hole is opposite to the host port, the fixing case defines an inserting hole and a pressing hole in the first direction, a pressing member is received in the pressing hole, a locking member is attached to the fixing case and is movable in a second direction, the host adapter passes the inserting hole along the first direction to be received in the receiving groove, when the host adapter moves along the first direction, the receiving member moves toward the transfer board along the first direction and locks to the locking member at the host adapter connecting the transfer board, the pressing member is pressed along the first direction to drive the locking member to move along the second direction to make the receiving member to separate from the locking member and move away from the transfer board to drive the host adapter to separate from the transfer board.

15. The all-in-one computer as claimed in claim 14, wherein the first direction is perpendicular to the second direction.

16. The all-in-one computer as claimed in claim 14, wherein the supporting member further comprises at least one elastic piece, a first end of the elastic piece is attached to the fixing case, a second end of the elastic piece is attached to the receiving member, when the host adapter is received in the receiving groove and moves along the first direction, the host adapter overcomes elastic force of the first elastic member to drive the receiving member to move toward the transfer board along the first direction, when the locking member separates from the receiving member, the first elastic member rebounds to make the receiving member to move away from the transfer board along the first direction to drive the host adapter to separate from the transfer board.

17. The all-in-one computer as claimed in claim 14, wherein the pressing member comprises a pressing portion and a guiding portion attached to the pressing portion, the guiding portion has a wedge surface, the locking member comprises a moving portion and a locking portion, the locking portion is configured to lock to the receiving member, when the pressing portion is pressed, the wedge surface abuts and drives the moving portion to move in the second direction to separate the locking portion from the receiving member.

18. The all-in-one computer as claimed in claim 17, wherein the locking member comprises a plate, the moving portion is fixed to an end of the plate, the locking portion perpendicularly protrudes from a side of the plate.

19. The all-in-one computer as claimed in claim 17, wherein the locking member is elastic, when the pressing portion is released, the locking member resets.

20. The all-in-one computer as claimed in claim 17, wherein the fixing case comprises an enclosure and a fixing frame fixed to an inner side of the enclosure, the locking member is positioned between the fixing frame and the enclosure and is fixed to the fixing frame, the fixing frame defines a locking hole, when the receiving member moves to be positioned under the locking hole along the first direction, the locking portion passes through the locking hole to abut an up end of the receiving member.

\* \* \* \* \*